United States Patent [19]
Johnson et al.

[11] Patent Number: 5,829,134
[45] Date of Patent: Nov. 3, 1998

[54] SPOOL VALVE LOADING METHOD AND APPARATUS

[75] Inventors: Lane M. Johnson, Rockford, Ill.; Robert W. Wednieski, West Bloomfield, Mich.

[73] Assignee: Unova IP Corp., Beverly Hills, Calif.

[21] Appl. No.: 869,764

[22] Filed: Jun. 5, 1997

[51] Int. Cl.$^6$ .............................. B23P 11/00; B23P 19/04
[52] U.S. Cl. .................... 29/890.124; 29/464; 29/701; 29/809; 29/213.1; 29/DIG. 78; 406/86
[58] Field of Search ............................ 29/890.124, 464, 29/701, 809, 252, 213.1, DIG. 78; 414/676; 406/86

[56] References Cited

U.S. PATENT DOCUMENTS 5,011,339  4/1991  Aurtoi et al. ......................... 406/86 X

FOREIGN PATENT DOCUMENTS 63-295129  12/1988  Japan ................................ 29/DIG. 78
1260310   9/1986  U.S.S.R. ................................. 406/86

*Primary Examiner*—S. Thomas Hughes
*Attorney, Agent, or Firm*—Barnes, Kisslle, Raisch, Choate, Whittemore & Hulbert, P.C.

[57] ABSTRACT

A method and apparatus for assembling a spool valve into a valve bore of a body by providing compressed gas to the valve bore at a pressure below the pressure of compressed gas supplied to a passage within a carrier body containing a spool valve substantially concentrically aligned with the valve bore to advance the spool valve from the passage into the valve bore. The compressed gas in the passage provides a force acting generally uniformly on the spool valve substantially concentrically aligning the spool valve within the passage. The compressed gas supplied to the valve bore also acts substantially uniformly on the spool valve tending to substantially concentrically align the spool valve within the valve bore when the spool valve is advanced therein. While the gas in the passage and the valve bore align the spool valve, the higher pressure of the gas in the passage advances the spool valve into the valve bore.

26 Claims, 2 Drawing Sheets

SPOOL VALVE LOADING METHOD AND APPARATUS

FIELD OF THE INVENTION

This invention relates generally to spool valves and more particularly, to a method and apparatus for assembling a spool valve into a valve bore of a body.

BACKGROUND OF THE INVENTION

Due to the extremely close tolerances, great care must be taken when assembling a spool valve into a valve bore of a body such as a transmission housing. Typically, the gap between the outer surface of the spool valve and the interior of the valve bore is about 0.0005 inch per side. This makes it very difficult to insert a spool valve into a valve bore without damaging the spool valve or having it become jammed within the bore.

Currently, the process is done mainly by hand due to the problems associated with mechanical insertion devices. Prior mechanical insertion devices have used an actuating rod, usually pneumatically or hydraulically driven, to directly push a spool valve into the valve bore. Extreme precision in aligning the spool valve with the valve bore is required with these devices and the devices are prone to jamming. Further, assembling spool valves into a valve bore either by hand or with current mechanical insertion devices can scratch or otherwise damage the mating spool valve and/or body bore surfaces thereby decreasing the integrity and useful life of the valve assembly in use.

SUMMARY OF THE INVENTION

A method and apparatus for assembling a spool valve into a valve bore of a body utilizing compressed gas to both align the spool valve with the bore and advance the aligned spool valve into the bore. Preferably, compressed gas is supplied to and discharged through the valve bore at a pressure below the pressure of compressed gas supplied to a transfer passage within a carrier body containing a spool valve substantially concentrically aligned with the valve bore to advance the spool valve from the transfer passage into the valve bore. The compressed gas in the passage provides a force acting generally uniformly on the spool valve to substantially concentrically align the spool valve within the passage and advance it. The compressed gas supplied to the valve bore also acts substantially uniformly on the spool valve tending to substantially concentrically align the spool valve within the valve bore as the spool valve is advanced into the bore and provides an air cushion between them. While the gas in the passage and the valve bore align the spool valve, the higher pressure of the gas in the passage advances the spool valve into the valve bore.

The apparatus preferably has a frame on which the valve body, such as a transmission housing, and the carrier body are received to accurately and concentrically align the transfer passage with the valve bore. The carrier body is preferably slidably received for axial reciprocation on a pair of guide rails so that it may be advanced and retracted relative to the transmission housing to facilitate assembly of spool valves into successive transmission housings. Preferably, each spool valve is individually loaded into the carrier body from an automatic spool valve loader received adjacent the transfer passage. Preferably, the spool valve is loaded into the carrier body within a receiving passage upstream of the transfer passage and is advanced into the transfer passage by an actuating rod operably coupled to a pneumatic or hydraulic cylinder. The receiving passage is larger in diameter than the transfer passage to facilitate movement of the spool valve therethrough and the compressed gas provided in the receiving passage and the transfer passage substantially concentrically aligns the spool valve with each passage as it is advanced through them.

Objects, features and advantages of this invention include providing a method and apparatus for assembling a spool valve into a valve bore of a body that concentrically aligns the spool valve within the valve bore throughout assembly, prevents damage to the spool valve during assembly, utilizes relatively low pressure compressed gas to align and advance the spool valve, removes contaminants from the valve bore, can be substantially automated, can be rapidly adapted to assemble varying spool valves into varying bodies, readily assembles successive spool valves into successive valve bores, is of relatively simple design, economical manufacture and assembly and is precise, reliable and has a long useful life in-service.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENT

Figure 1:
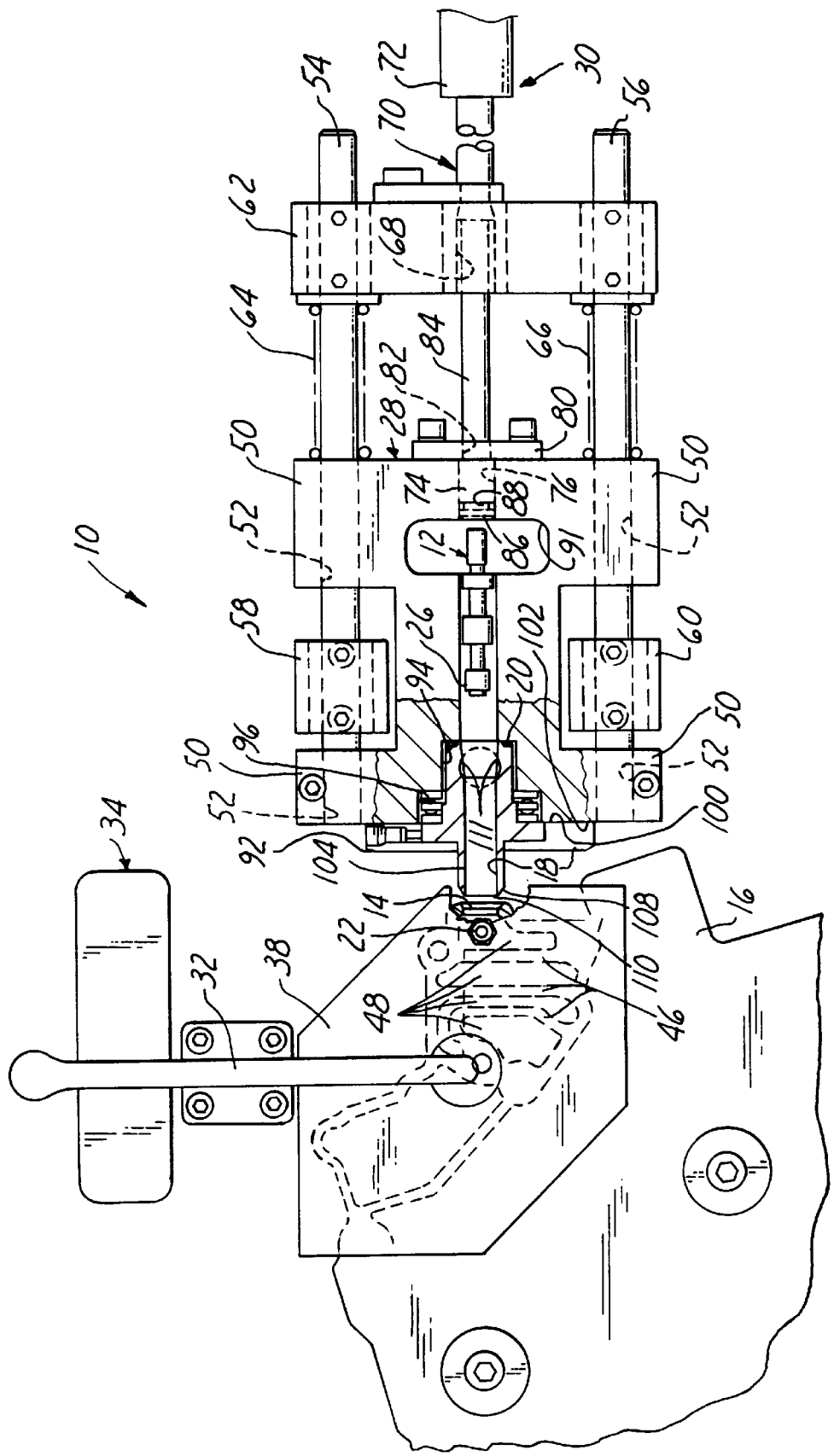
FIG. 1 is atop view of an apparatus in accordance with the present invention.
Figure 2:
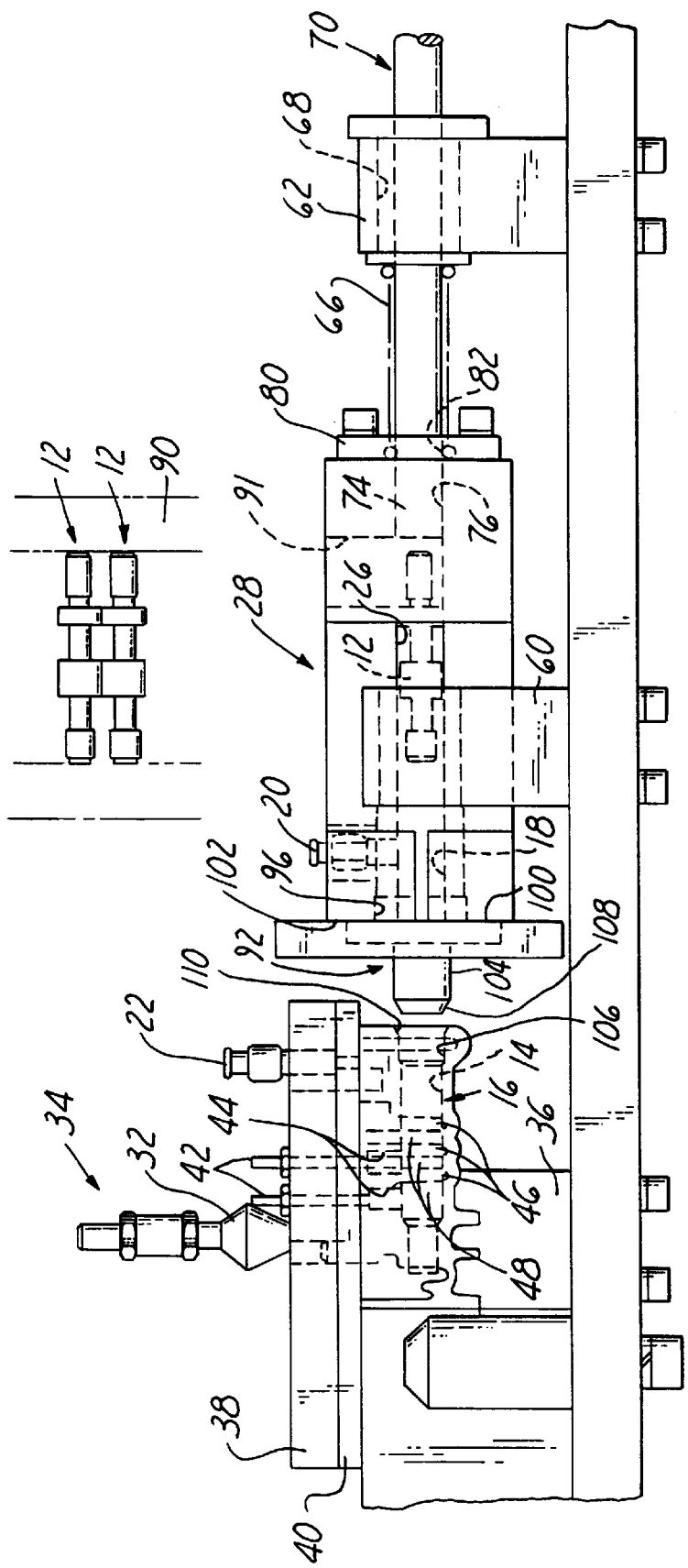
FIG. 2 is a side view of the apparatus of FIG. 1.

Referring in more detail to the drawings, FIGS. 1 and 2 illustrate an apparatus 10 embodying this invention for inserting a spool valve 12 into a bore 14 in a housing 16 such as a transmission shift body by advancing the spool valve 12 through a transfer passage 18 with compressed gas supplied to the transfer passage 18 through an inlet port 20 at a pressure greater than the pressure of compressed gas delivered through a gas inlet 22 to the valve bore 14. The spool valves 12 are deposited one at a time into a passage 26 in a carrier body 28 through which the valves 12 are advanced through the stream of compressed gas such as air into the transfer passage by a pusher mechanism 30. When sufficiently received within the transfer passage 18, the valve 12 is advanced through the transfer passage 18 and into the housing bore 14 by the difference in pressure between the compressed gas delivered to the transfer passage 18 and to the bore 14.

The housing 16 is preferably clamped by an arm 32 of a toggle clamp 34 between a locator block 36 and a plate 38 with a sealing member 40 such as a layer of a rubber material disposed therebetween providing a seal adjacent the valve bore 14 to prevent the escape of the compressed gas from the transmission housing 16. Pins 42 are inserted through the plate 38 and the sealing member 40 into openings 44 in the transmission housing 16 to plug the openings 44 and prevent the escape of gas therethrough. Either these pins 42 or other locators and the block 36 align the axis of the housing valve bore 14 coaxially with the axis of the transfer passage 18 of the carrier body 28. The valve bore 14 extends through several walls 46 which define separate passages 48 through which fluid in the housing 16 is communicated with the spool valve 12.

The carrier body 28 is generally H-shaped providing four arms 50 each with an opening 52 therethrough receiving one of a pair of guide rails 54, 56 for axial reciprocation of the carrier body 28 along the guide rails 54, 56. The guide rails 54, 56 are supported by a pair of stop blocks 58, 60 fixed to the guide rails 54, 56 between adjacent arms 50 to limit the axial reciprocation of the carrier body 28, and a block 62 fixed to the rails 54, 56. The carrier body 28 is spring biased preferably by compression springs 64, 66 received on the guide rails 54, 56 and bearing on the carrier body 28 and block 62.

The block 62 has a central hole 68 therethrough to receive an actuating rod 70 of the pusher mechanism 30 which is preferably actuated by a fluid cylinder 72. The actuating rod 70 has an enlarged diameter head 74 attached to its free end and received in a bore 76 of the carrier body 28 and engagable with a stop plate 80 having a hole 82 through which the shank 84 of the actuating rod 70 reciprocates. The head 74 preferably has an O-ring 86 received in a slot 88 formed in the head 74 to substantially seal the passage 26 in the carrier body 28 and prevent leakage of the compressed gas beyond the head 74 when the spool valve 12 is sufficiently within the transfer passage 18 such that the pressure of the compressed gas acts on the spool valve 12 to advance it through the transfer passage 18. When the actuating rod 70 is retracted towards the block 62 the head 74 of the actuating rod 70 contacts the stop plate 80 to move the carrier body 28 towards the block 62 against the bias of the springs 64, 66. The carrier body 28 is advanced towards the housing 16 by the force of the springs 64, 66 when the actuating rod 70 is extended into the passage 26 to advance the spool valve 12 into the transfer passage 18.

An automatic spool valve loader 90 contains a plurality of spool valves 12 and loads the spool valves 12 one at a time into the carrier body 28, through a receiving slot 91 formed in the carrier body 28 which opens into the passage 26, to supply the apparatus 10 with one spool valve 12 for each successive housing 16. The spool valve loader may be controlled by a computer or some such other device suitable to substantially automate delivery of individual spool valves 12 to the carrier body 28. The passage 26 is preferably slightly larger in diameter than the transfer passage 18 to facilitate movement of the spool valve 12 therethrough when advanced by the pusher mechanism 30.

The transfer passage 18 is preferably formed in an insert 92 releasably received within a bore 94 and counterbore 96 of the carrier body 28 and having a radially extending flange 98 with a substantially flat face 100 received adjacent a substantially flat face 102 of the carrier body 28 disposed substantially perpendicular to the axis of the bore 14 to coaxially align the transfer passage 18 with the valve bore 14. The insert 92 has an axially extending wall 104 defining the open end of the transfer passage 18 and constructed to be at least partially received within a counterbore 106 of the housing 16 and preferably has a beveled end constructed to be received adjacent a chamfer 110 in the housing 16 adjacent the valve bore 14. The transfer passage 18 has a frustoconical entrance portion 111 providing a smooth transition from the larger diameter passage 26 to the transfer passage 18 which has a diameter equal to or only slightly larger than the maximum diameter of the valve bore 14. With the use of various inserts 92, the apparatus 10 can be readily changed to assemble spool valves 12 of different construction into complimentary housings 16.

In use, the compressed gas, such as air, is supplied to the carrier body 28 through the inlet port 20 at a pressure preferably ranging between about 10 psig and 30 psig and the compressed gas supplied to the housing 16 through the gas inlet 22 is at a pressure of preferably between about 5 psig and 20 psig. Typically, the pressure differential between them is about 5 to 15 psia and preferably 5 to 10 psia. More preferably, the compressed gas supplied to the carrier body 28 is at a pressure of about 15 psig and the pressure of the gas supplied to the housing 16 is at a pressure of about 10 psig. The compressed gas within the transfer passage 18 acts substantially uniformly on the spool valve 12 to concentrically align the spool valve 12 within the passage 26, the transfer passage 18 and the valve bore 14 as it moves therethrough. The compressed gas supplied to the housing 16 opposes the force of the compressed gas supplied to the carrier body 28 and also acts substantially uniformly on the spool valve 12 to maintain its concentric alignment with the transfer passage 18 and the valve bore 14 when received therein. Further, the difference in pressure between the transfer passage 18 and the valve bore 14 is large enough to drive the spool valve 12 from the transfer passage 18 and into the valve bore 14 yet small enough to avoid forcing the spool valve 12 into the valve bore 14 and thereby damaging the spool valve 12 or valve bore 14 or causing the spool valve 12 to become jammed within the valve bore 14. Even if the spool valve 12 becomes jammed during assembly into the valve bore 14, the relatively small pressure differential acting on the spool valve 12 is insufficient to damage it or the valve bore 14.

To assemble a spool valve 12 into the valve bore 14 of the housing 16, a spool valve 12 is loaded into the passage 26 of the carrier body 28 by the automatic spool valve loader 90. The actuating rod 70 of the pusher mechanism 30 is advanced towards the spool valve 12 and the carrier body 28 is moved to follow the motion of the actuating rod 70 through the force of the springs 64, 66 biasing the carrier body 28. When the carrier body 28 and housing 16 are mated, the beveled end 108 of the insert 92 and the chamfer 110 of the housing 16 adjacent the valve bore 14 align and center the transfer passage 18 with the valve bore 14. Before the head 74 and O-ring 86 of the actuating rod 70 closes the passage 26, at least some of the compressed gas flows through the passage 26 and around the spool valve 12 to center it within the passage 26 and facilitate its movement therethrough when advanced by the head 74 of the actuating rod 70.

Continued advancement of the actuating rod 70 towards its extended position after the carrier body 28 and housing 16 are mated disengages the head 74 from the stop plate 80 and advances the head 74 towards the spool valve 12. When the head 74 enters the passage 26 it substantially seals the passage 26 to prevent the escape of compressed gas from the passage 26. The actuating rod 70 advances the spool valve 12 sufficiently through the passage 26 and adjacent to or partially within the transfer passage 18. The pressure of the gas acting on the trailing portion of the spool valve 12 upstream of the port 20 is generally equal to the pressure of the gas supplied to the carrier body, or 15 psig. The pressure of the gas acting on the leading portion of the spool valve 12 advanced beyond or downstream of the port 20 is generally lower than the pressure acting on the upstream or trailing portion of the spool valve 12. Thus, the compressed gas acting on the trailing portion of the spool valve 12, which is at a higher pressure than the compressed gas acting on the leading portion, advances the spool valve 12 into the transfer passage 18 and thereafter into the valve bore 14 of the housing 16.

The addition of a compressed gas, such as air, at different pressures to the transfer passage 18 and the valve bore 14 provides an air bearing and a slight driving force to ease the spool valve 12 into the valve bore 14 while maintaining it substantially concentrically aligned with both the transfer passage 18 and the valve bore 14 to prevent the spool valve 12 from being damaged or becoming jammed during assembly. The process can be substantially completely automated thereby eliminating the cost and time associated with manually inserting the spool valve 12 into the valve bore 14 and the high precision and relatively small force applied to the spool valve 12 during assembly prevents the problems associated with prior mechanical assembly devices. The insert 92 received in the carrier body 28 permits the apparatus 10 to be quickly converted to insert spool valves 12 with various designs into various bodies. Thus, the apparatus and method of inserting the spool valve 12 into the valve bore 14 is efficient, readily adaptable to various spool valve 12 designs and housings 16, faster and easier than manual insertion and more precise and less susceptible to damaging the spool valve and or housing bore than prior mechanical insertion devices.

We claim:

1. An apparatus to assemble a spool valve into a valve bore of a housing comprising:
   a carrier body;
   a passage in the carrier body constructed to receive a spool valve;
   an actuating rod having one end disposed adjacent the spool valve and constructed to advance the spool valve into the passage; and
   a compressed gas supply in communication with the passage and the valve bore to deliver compressed gas to each of them with the compressed gas in the passage at a higher pressure than the compressed gas in the valve bore whereby the actuating rod advances the spool valve into the passage and the compressed gas drives the spool valve into the valve bore in opposition to the force on the spool valve of the compressed gas delivered to the valve bore, and the compressed gas in the passage and in the valve bore maintain the spool valve substantially concentrically aligned therewith.

2. The apparatus of claim 1 also comprising a cylinder having a piston slidably received for reciprocation therein and operably associated with the actuating rod to drive the actuating rod.

3. The apparatus of claim 2 wherein the cylinder is a hydraulic cylinder.

4. The apparatus of claim 2 wherein the cylinder is a pneumatic cylinder.

5. The apparatus of claim 1 wherein the pressure of the compressed gas in the passage is between about 10 to 30 psig and the pressure of the compressed gas in the valve bore is between about 5 to 20 psig.

6. The apparatus of claim 5 wherein the pressure of the compressed gas in the passage is about 15 psig and the pressure of the compressed gas in the valve bore is about 10 psig.

7. The apparatus of claim 1 also comprising a counterbore in the housing substantially concentric with the valve bore and said passage is disposed at least partially within the counterbore to substantially concentrically align the passage and the valve bore.

8. The apparatus of claim 1 wherein the housing and carrier body are received on a frame with the valve bore substantially concentrically aligned with the passage.

9. The apparatus of claim 1 also comprising a spool valve loader containing a supply of spool valves and constructed to individually load a spool valve into the carrier body.

10. The apparatus of claim 9 wherein the spool valve loader is computer controlled to automatically load successive spool valves into the carrier body for insertion into successive housings.

11. The apparatus of claim 1 wherein the difference in pressure of the compressed gas supplied to the passage and the valve bore is in the range of about 5 to 10 psia.

12. The apparatus of claim 5 wherein the difference in pressure of the compressed gas supplied to the passage and the valve bore is in the range of about 5 to 10 psia.

13. The apparatus of claim 1 wherein the passage has an open end and the actuating rod substantially seals the passage when advanced therein to prevent leakage of the compressed gas beyond the actuating rod.

14. The apparatus of claim 13 wherein the rod advances the spool valve sufficiently so that its leading end is downstream of the point at which the compressed gas, at higher pressure, enters the passage.

15. The apparatus of claim 14 wherein the minimum diameter of the passage is only slightly larger than the maximum diameter of the spool valve.

16. The apparatus of claim 1 wherein said passage has a frustoconical transition area joining a larger diameter portion of the passage with a smaller diameter portion of the passage downstream of the larger diameter portion and the higher pressure compressed gas is admitted to the passage in the transition area.

17. The apparatus of claim 1 wherein the point at which the higher pressure compressed gas enters the passage is upstream of the point where the compressed gas enters the valve bore an axial distance at least substantially equal to the axial length of the valve spool.

18. A method of assembly of a spool valve into a valve bore of a housing comprising the steps of:
   a.) providing a carrier body having a passage substantially concentrically aligned with the valve bore;
   b.) providing a spool valve in the passage;
   c.) supplying compressed gas to the passage and the valve bore with the pressure of the gas within the passage being greater than the pressure of the gas within the valve bore, thereby advancing the spool valve into the valve bore.

19. The method of claim 18 wherein the pressure of the compressed gas in the passage is between about 10 to 30 psig and the pressure of the compressed gas in the valve bore is between about 5 to 20 psig.

20. The method of claim 19 wherein the pressure of the compressed gas in the passage is about 15 psig and the pressure of the compressed gas in the valve bore is about 10 psig.

21. The method of claim 19 wherein the difference in pressure between the compressed gas supplied to the passage and the valve bore is in the range of about 5 to 10 psia.

22. The method of claim 18 wherein the passage is partially received in a counterbore adjacent the valve bore to substantially concentrically align the passage and the valve bore.

23. The method of claim 18 wherein the difference in pressure between the compressed gas supplied to the passage and the valve bore is in the range of about 5 to 10 psia.

24. The method of claim 18 wherein the spool valve is provided in the upstream end of the passage and is advanced within the passage by an actuating rod.

25. The method of claim 24 wherein the actuating rod advances the spool valve sufficiently within the passage so that its leading end is downstream of the point at which the compressed gas is supplied to the passage.

26. The method of claim 18 wherein the spool valve is provided in the passage by an automatic spool valve loader which contains a plurality of spool valves and functions to substantially automatically deliver the spool valves, one at a time, into the passage.

* * * * *